United States Patent [19]

Citta

[11] Patent Number: 5,151,785
[45] Date of Patent: Sep. 29, 1992

[54] HDTV TRANSMISSION SYSTEM WITH REDUCED SUSCEPTIBILITY TO NTSC COCHANNEL INTERFERENCE

[75] Inventor: Richard W. Citta, Oak Park, Ill.

[73] Assignee: Zenith Electronics Corporation

[21] Appl. No.: 709,960

[22] Filed: Jun. 4, 1991

[51] Int. Cl.⁵ .............................................. H04N 7/04
[52] U.S. Cl. ..................................... 358/141; 358/186
[58] Field of Search ............... 358/186, 31, 36, 141, 358/83, 188

[56] References Cited

U.S. PATENT DOCUMENTS

| | | | |
|---|---|---|---|
| 4,216,496 | 8/1980 | Lothian et al. | 358/83 |
| 4,802,000 | 1/1989 | Willis | 358/31 X |
| 4,958,230 | 9/1990 | Jonnalagadda et al. | 358/186 |
| 5,003,389 | 3/1991 | Isobe et al. | 358/31 X |

Primary Examiner—Victor R. Kostak

[57] ABSTRACT

A digital HDTV video data signal having a substantially flat spectrum is modified by a prefiltering operation to impose a spectral periodicity on the transmitted signal corresponding to the spectral periodicity of an NTSC television signal. The received signal is processed by a post filter having a frequency response comprising the inverse of the prefilter, whereby the received digital video data signal is substantially restored while any received NTSC cochannel interference is substantially attenuated.

13 Claims, 2 Drawing Sheets

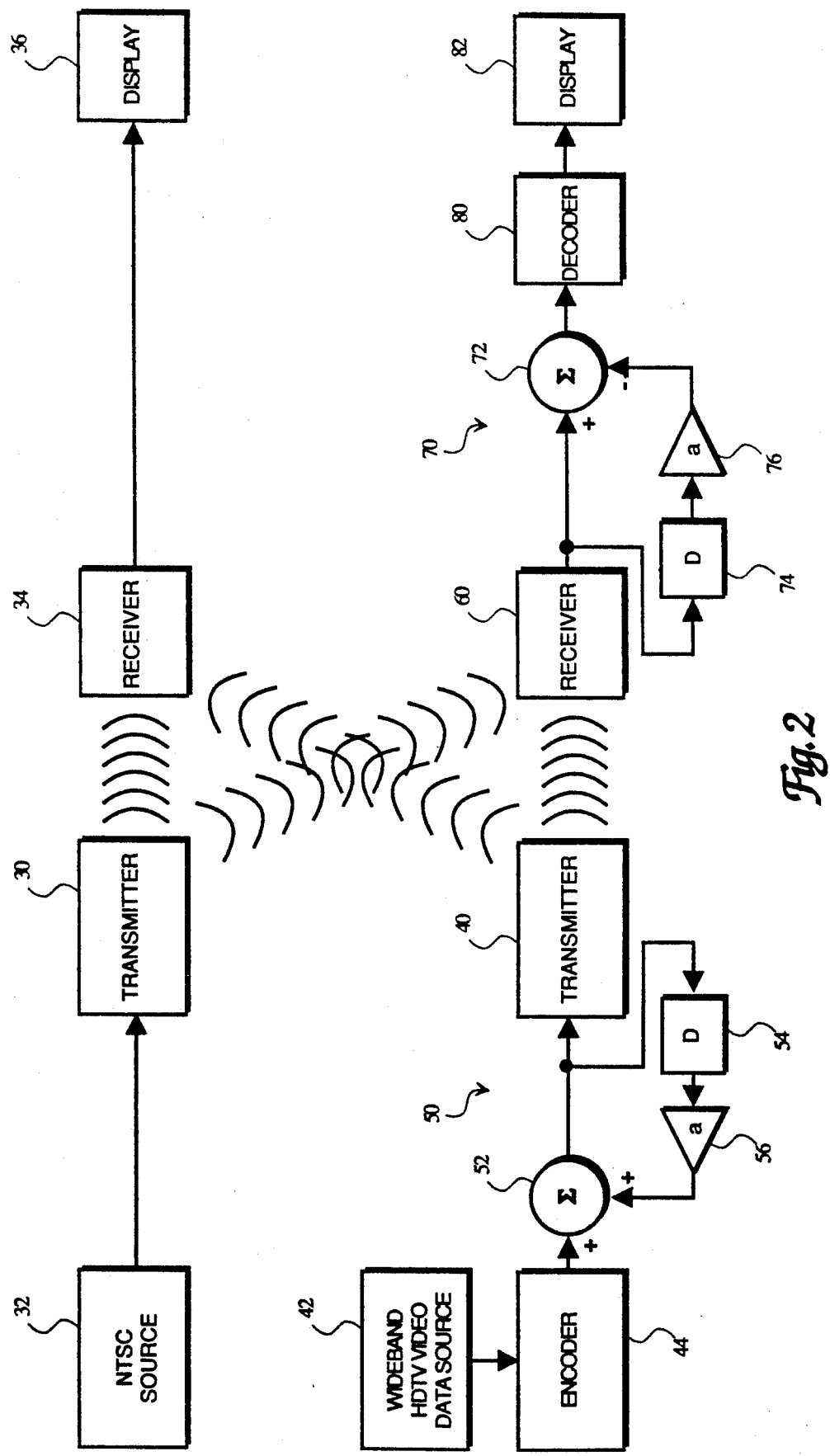

HDTV TRANSMISSION SYSTEM WITH REDUCED SUSCEPTIBILITY TO NTSC COCHANNEL INTERFERENCE

CROSS-REFERENCE TO RELATED APPLICATIONS

This application is related to copending application Ser. No. 370,222, filed Jun. 22, 1989, now U.S. Pat. No. 5,043,805 and assigned to the assignee of the present invention.

BACKGROUND OF THE INVENTION

The present invention generally relates to television signal transmission systems and particularly concerns a television signal transmission system which facilitates the transmission of a digitally encoded high definition television (HDTV) signal on a television channel also being used in a nearby television service area for the transmission and reception of NTSC encoded television signals.

Much interest has recently been generated in so-called "digital" HDTV television systems. Such systems compress a wideband, generally up to about 37 MHz, video signal for transmission over a standard 6 MHz television channel. Various techniques have been proposed to effect transmission of the compressed signal; see for example, copending application Ser. No. 611,236, filed Nov. 9, 1990, now U.S. Pat. No. 5,087,975 and entitled VSB HDTV Transmission System With Reduced NTSC Co-Channel Interference. In contrast to the NTSC form of analog transmission, the HDTV signal is preferably transmitted in the form of a multi-level (i.e., two or more) video data signal, the latter form of transmission being truly digital in character since it is effected by employing a limited number of discrete transmission signal levels. Assuming that the interference threshold of the system has not been exceeded, such digital transmission systems afford the advantage that essentially perfect reproduction of the received signal is possible.

With regard to the matter of spectrum availability, it is anticipated that HDTV service will be provided over presently unused television channels to avoid obsolescence of existing NTSC services. It is further anticipated that at least in some television service areas HDTV transmission will be effected over channels also used in nearby television service areas for transmission and reception of NTSC signals. In the past, the former channels, sometimes referred to as "taboo" channels, have been unassigned to avoid cochannel interference between the nearby television service areas. However, due to the increased demand for spectrum utilization raised by the addition of HDTV service, it is anticipated, as previously mentioned, that previously unused taboo channels will, of necessity, be employed to at least partially effect this new television service In this regard, the issue of cochannel interference between nearby NTSC and HDTV transmissions must be addressed and, in particular, a solution to the problem of NTSC cochannel interference in a received digital HDTV transmission must be provided since excessive interference could largely negate the ability of the HDTV receiver to reproduce any meaningful information.

It is, therefore, a basic object of the present invention to provide an improved HDTV transmission system.

It is a more specific object of the invention to provide a system for reducing NTSC cochannel interference in a received digitally transmitted HDTV signal.

BRIEF DESCRIPTION OF THE DRAWINGS

These and other objects and advantages of the invention will be apparent upon reading the following description in conjunction with the drawings, in which:

FIG. 2 is a block diagram illustrating a preferred implementation of the invention.

DESCRIPTION OF THE PREFERRED EMBODIMENTS

Figures 1A, 1B, 1C, 1D, 1E:
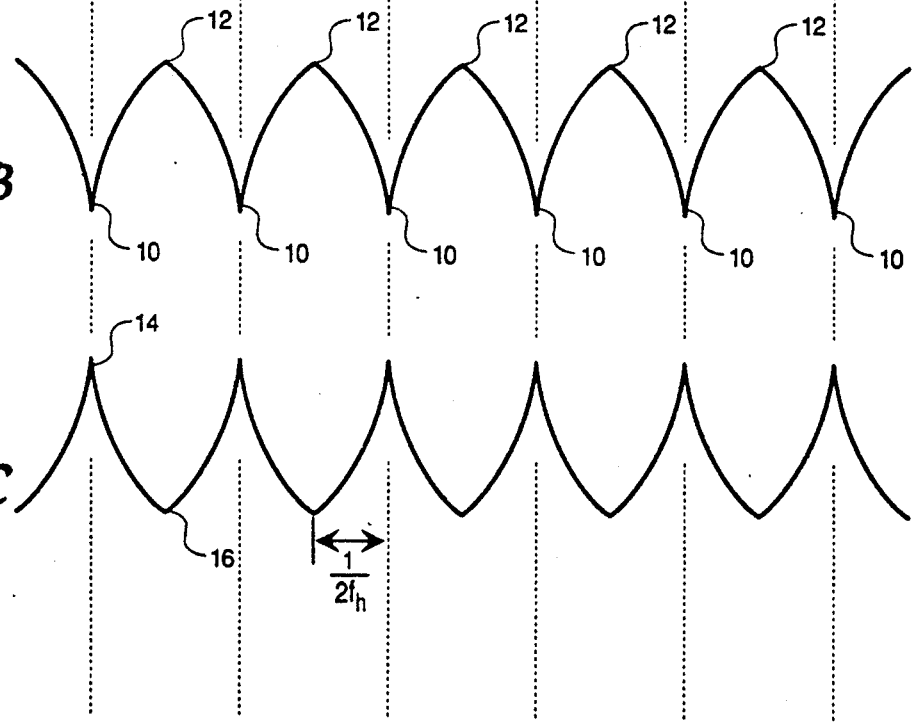
FIGS. 1A–1E are a series of waveforms illustrating the principles of the present invention.

Referring to FIG. 1A, the spectrum of an NTSC television signal is known to comprise a periodic structure in which the video energy is predominantly concentrated near harmonics of the NTSC line-scanning frequency fh (15.734 KHz). This results from the fact that the luminance component of the video signal, while not identical, is quite similar on successive scanning lines. These harmonics, which are generated in relation to the channel picture carrier frequency, are identified in the FIGURE by the letter P. Additional sideband components (not shown) exist at multiples of the field frequency (about 60 Hz) from each line scanning harmonic P, and these represent the variation of the luminance component in a temporal sense. The chroma component of the video signal is represented by a plurality of harmonics C interleaved halfway between the line-frequency harmonics P, that is, at odd harmonics of one-half the line frequency. The chroma harmonics C are normally about 20 db down from the line-frequency harmonics P, which therefore represent the majority of the energy in the transmitted signal Consider now the situation of nearby HDTV and NTSC television service areas in which respective television signals are transmitted and received over the same channel. In order to minimize the effect of NTSC cochannel interference in the received HDTV signal a filter response such as depicted in FIG. 1B may be incorporated in the HDTV receiver. This response comprises a plurality of notches 10 spaced from each other by 11/fh (the NTSC horizontal scanning-line frequency) and arranged in phase to coincide with the line-frequency harmonics P of the NTSC cochannel interfering signal. Accordingly, incorporation of a filter having a response as depicted in FIG. 1B in an HDTV receiver, will substantially attenuate cochannel interference from a nearby NTSC transmitter. It will be observed that the filter response of FIG. 1B includes a plurality of peaks 12 coinciding with the chroma harmonics C of the NTSC cochannel signal. However, since the energy of the chroma harmonics C is relatively low, the peaking of these components effected by the filter response of FIG. 1B, which will generally be limited to about 6 db, will not appreciably effect the operation of the HDTV receiver.

While the filter response of FIG. 1B will effectively reduce NTSC cochannel interference in the HDTV receiver, if appropriate precautions are not taken, it will also have an adverse effect on the received HDTV digital video data signal. That is, a digital HDTV transmission normally comprises generally random video data characterized by a substantially flat spectrum. Clearly, processing such a signal in an HDTV receiver incorporating the filter response of FIG. 1B would seriously distort the received video data. Thus, in accordance with the present invention, the effect introduced by the HDTV receiver filter response of FIG. 1B on the received HDTV video data is compensated by prefiltering the HDTV video data signal at the HDTV transmitter with the complementary response characteristic of FIG. 1C. It will be observed that the response characteristic of FIG. 1C, which effectively introduces a spectral periodicity corresponding to that of the NTSC signal into the otherwise flat spectrum of the HDTV video data signal, is the inverse of that illustrated in FIG. 1B, having peaks 14 substantially coinciding with notches 10 and notches 16 substantially coinciding with peaks 12. Prefiltering the HDTV video data signal at the HDTV transmitter according to the response characteristic of FIG. 1C and then postfiltering the received prefiltered HDTV video data signal according to the inverse response characteristic of FIG. 1B will, therefore, have no effect on the HDTV video data signal. However, at the same time, and as previously explained, the filter response of FIG. 1B will substantially reduce NTSC cochannel interference in the HDTV receiver.

An alternate embodiment of the invention is illustrated in FIGS. 1D and 1E. In this embodiment, the HDTV receiver includes the filter response of FIG. 1D which has notches 18 corresponding to both the line-frequency harmonics P and chroma harmonics C of the cochannel NTSC signal. As a result, both components P and C of the cochannel NTSC signal are attenuated in the HDTV receiver. The HDTV prefilter response characteristic is illustrated in FIG. 1E and, as before, comprises the inverse of the response of FIG. 1D.

In either of the foregoing embodiments, i.e., either FIGS. 1B and 1C or FIGS. 1D and 1E, a spectral periodicity related to the NTSC signal is imposed on the transmitted HDTV video data signal. This spectral periodicity will have an effect on the interference caused by the cochannel HDTV transmission in an NTSC receiver. In particular, in the case of the embodiment of FIGS. 1B and 1C the familiar venetian blind interference will result while in the embodiment of FIGS. 1D and 1E a broken cross-hatch type of interference will result. In the latter case, the result is quite acceptable for light levels of interference, but may become objectionable for higher interference levels.

FIG. 2 illustrates a preferred implementation of the present invention. A first television service area includes an NTSC transmitter 30 transmitting an NTSC television signal over a selected 6 MHz television channel in response to an NTSC signal source 32. The spectrum of this transmission is shown in FIG. 1A, with the video energy being predominated concentrated near the harmonics P of the NTSC line-scanning frequency fh. An NTSC receiver 34 tuned to the selected channel receives the transmission and applies an output signal to a display 36 for reproducing the transmitted television signal.

At the same time, in a nearby television service area an HDTV transmitter 40 transmits an HDTV signal on the same channel for reception by an HDTV receiver 60. The HDTV signal is provided in the form of a digital video data signal by a wideband video source 42 which is suitably compressed by an encoder 44 prior to transmission. As previously mentioned, the spectrum of the digital video data signal at the output of encoder 44 is substantially flat. According to the present invention, a linear comb filter 50 is interposed between encoder 44 and transmitter 40. Comb filter 50 comprises a feedback circuit including a linear summer 52 having a first input coupled to the output of encoder 44 and an output coupled to transmitter 40. The output of summer 52 is also coupled back through a delay element 54 and an amplifier 56 to a second input of summer 52. Comb filter 50 will effect either of the prefiltering response characteristics of FIG. 1C or 1E by appropriately selecting the delay characterizing delay element 54. That is, the prefiltering characteristic of FIG. 1C is effected by selecting the delay equal to the NTSC line-scanning interval (i.e., 1/fh) and the prefiltering characteristic of FIG. 1E is effected by selecting the delay equal to twice the NTSC line-scanning interval (i.e., 2/fh). To insure stable operation, the gain "a" of amplifier 56 is preferably selected to have a value less than one. As mentioned previously, the effect of comb filter 50 is thus to impose a spectral periodicity on the flat spectrum video data signal generated by encoder 44 corresponding to that shown in either FIG. 1C or FIG. 1E.

The received HDTV signal (and any cochannel NTSC interference) is coupled from receiver 60 through an inverse comb filter 70 for application to an HDTV decoder 80 and therefrom to a display 82. Comb filter 70 comprises a feedforward circuit including a linear summer 72 having a first input coupled to the output of receiver 60 and an output coupled to decoder 80. The output of receiver 60 is also coupled through a delay element 74 and an amplifier 76 to a negative input of summer 72. Comb filter 70 is operative for effecting the filter response characteristic of FIG. 1B by selecting the delay of element 74 equal to the NTSC line-scanning interval (i.e., 1fh) and for effecting the filter response characteristic of FIG. 1D by selecting the delay of element 74 equal to twice the NTSC live-scanning interval (i.e., 2/fh). Due to the inclusion of amplifier 76 (the gain of which is preferably less than one), the notches of the receiver filter response characteristic will have a finite depth of $(1-a)$. Also, the peaks of the transmitter filter response will likewise be at a level of $1/(1-a)$.

While particular embodiments of the invention have been shown and described, it will be apparent to those skilled in the art that modifications thereof may be made without departing from the invention in its broader aspects, and therefore, the aim in the appended claims is to cover all such changes and modifications as fall within the true spirit and scope of the invention.

I claim:

1. A method of transmitting an HDTV signal from a site within a first television service area using a channel also used to transmit an NTSC television signal from a site within a nearby television service area, comprising:
   providing a digital signal representing said HDTV signal, said digital signal having a substantially flat frequency spectrum;
   imposing a predetermined spectral periodicity on said digital signal corresponding to the spectral periodicity characterizing said NTSC television signal;
   transmitting said digital signal over said channel such that the spectral periodicities of said digital and NTSC signals are substantially phase coincident; and
   receiving said transmitted signal and subjecting the received signal to a filter response having a characteristic comprising the inverse of said predetermined spectral periodicity, whereby said received digital signal is substantially restored while any received components of said NTSC signal are substantially attenuated.

2. The method of claim 1 wherein said predetermined spectral periodicity comprises successive notches at the NTSC line-scanning frequency.

3. The method of claim 1 wherein said predetermined spectral periodicity comprises successive notches at twice the NTSC line-scanning frequency.

4. The method of claim 1 wherein said digital signal represents a compressed wideband video signal.

5. A system for transmitting an HDTV signal from a site within a first television service area using a channel also used to transmit an NTSC television signal from a site within a nearby television service area, comprising:
   means for providing a digital signal comprising a compressed representation of said HDTV signal, said digital signal having a substantially flat frequency spectrum;
   a linear feedback filter for imposing a predetermined spectral periodicity on said digital corresponding to the spectral periodicity characterizing said NTSC television signal;
   means for transmitting said filtered digital signal over said channel such that the spectral periodicities of said filtered digital signal and said NTSC signal are substantially phase coincident; and
   means for receiving said transmitted signal including a linear feedforward filter for subjecting the received signal to a filter response characteristic comprising the inverse of said predetermined spectral periodicity, whereby said received digital signal is substantially restored while any received components of said NTSC signal are substantially attenuated.

6. The system of claim 5 wherein said feedback filter includes a feedback path characterized by a delay of 1/fh and a gain of less than one, where fh is the NTSC line-scanning frequency.

7. The system of claim 6 wherein said feedforward filter includes a feedforward path characterized by a delay of 1/fh and a gain of less than one.

8. The system of claim 5 wherein said feedback filter includes a feedback path characterized by a delay of 2/fh and a gain of less than one, where fh is the NTSC line-scanning frequency.

9. The system of claim 8 wherein said feedforward filter includes a feedforward path characterized by a delay of 2/fh and a gain of less than one.

10. A receiver for receiving an HDTV signal transmitted from a site within a first television service area using a channel also used to transmit an NTSC television signal from a site within a nearby television service area, comprising:
    means for receiving a digital signal comprising a compressed representation of said HDTV signal, said digital signal having a predetermined spectral periodicity corresponding to and phase coincident with said NTSC television signal; and
    filter means having a filter response characteristic comprising the inverse of said predetermined spectral periodicity for converting said received digital signal to an output digital signal having a substantially flat frequency spectrum while substantially attenuating any received components of said NTSC television signal.

11. The receiver of claim 10 wherein said filter means comprises a linear feedforward filter.

12. The receiver of claim 11 wherein said feedforward filter includes a feedforward path characterized by a delay of N/fh, where N is a positive integer and fh is the NTSC line-scanning frequency.

13. The receiver of claim 12 wherein said feedforward path is characterized by a gain of less than one.

* * * * *